3,013,944
PROCESS FOR THE PRODUCTION OF GASTRO-
INTESTINAL HORMONES AND HORMONE CON-
CENTRATE
Johan Erik Jorpes, 8 Torsgatan, and Victor Mutt,
46 Ralambsvagen, both of Stockholm, Sweden
No Drawing. Filed Dec. 7, 1959, Ser. No. 857,527
7 Claims. (Cl. 167—74)

The present invention relates to a novel process for the production of a secretin, pancreozymin and cholecystokinin concentrate, for the production and separation therefrom of a concentrate of cholecystokinin pancreozymin and to the novel pancreozymin and cholecystokinin concentrate so produced.

The gastro-intestinal hormones secretin, pancreozymin and cholecystokinin are known useful hormones, secretin in particular being utilized for the study of the pancreatic function. Cholecystokinin makes the bile ducts visible in the X-ray examination due to its capacity of emptying a gall bladder filled with an opaque medium. Through the action of all these hormones juice can be obtained from the pancreatic and the bile ducts for examination on bacteria, leucocytes and cancer cells prevailing in inflammatory or neoplastic conditions in these organs. These hormones however have not been available in large quantities on a commercial scale due to the difficulty of obtaining these hormones from natural sources such as the duodenum of the hog. In methods previously proposed, the mucosa of the duodenum was boiled, for example with four times its weight of dilute hydrochloric acid, for extraction of the secretin. Another method involved in the extraction with alcohol and the adsorption of the secretin on bile acids. These methods however are not particularly feasible since large amounts of inert gelatinous protein material were extracted which rendered further purification difficult.

Finally it became practice to treat the inside of the intestinal wall or the mucosa itself at low temperature with a dilute hydrochloric or sulfuric acid solution, whereupon a precipitate containing secretin and pancreozymin cholecystokinin was obtained on adding sodium chloride to full saturation. This crude product has been used by most of the authors as starting material for the purification of the above mentioned gastrointestinal hormones. The crude produce thus obtained was very bulky. Due to the presence of proteolytic enzymes capable of inactivating the gastrointestinal hormones difficulties were encountered in the attempts at getting stable preparations of secretin from this crude material.

In accordance with the present invention, the discovery has been made that animal intestines containing secretin, pancreozymin and cholecystokinin can be subjected to the action of an aqueous medium at approximately 100° C. for short periods of time to coagulate the proteins and inactivate the enzymes without affecting the hormone content thereof.

There has therefore been provided in accordance with the present invention a novel process, which includes as an essential first step, the treatment of animal intestines, preferably of the hog, with hot water at approximately 100° C. for a period of time necessary to inactivate enzymes and coagulate proteins, i.e. a period of time preferably of the order of from 5 to 10 minutes.

There has been further discovered in accordance with the present invention that the so-treated intestines may be selectively extracted with dilute acetic acid to remove the hormone content therefrom and that the hormone content of the extract may be readily adsorbed by a natural or synthetic cation exchanger of high molecular weight containing carboxylic groups, thus rendering concentrations of the extract by means of evaporation superfluous.

It has further been discovered in accordance with the present invention, that the hormones thus adsorbed by the cation exchanger may be removed therefrom by treatment with the dilute mineral acid and precipitated from the mineral acid solution with an inorganic salt to give a concentrate containing in a relatively small mass the secretin, cholecystokinin and pancreozymin content. Further it has been found, that upon further treatment including separation of the secretin a usable concentrate of cholecystokinin and pancreozymin in the form of a dry powder could be produced. This novel potent concentrate was clinically effective to cause maximal contraction of the gall bladder when an amount of 3 mg. was injected intravenously.

In practicing the process of the present invention, a suitable animal intestine such as that derived from cattle or hogs is immersed in hot water, which is preferably at boiling temperature for a period of time of from 5 to 10 minutes. The animal intestine is derived from freshly slaughtered animals and has been preserved in ice water. Prior to the treatment the intestine is everted and washed with ice water. Preferably the first meter of the duodenum of the hog is utilized for this process.

The duodenum which has been treated in accordance with the first step may be utilized immediately thereafter or kept in a frozen condition. The so-treated intestinal material for the second step of the process is then extracted for a certain period of time of the order of 20 hours at preferably room temperature with dilute acetic acid preferably of 0.5 N strength. It may be noted that as the result of the first step of the instant process the native inert proteins of the intestinal wall are rendered insoluble at room temperature in the dilute lower fatty acid and the enzymes inactivated whereas the desired hormones are unaffected by such treatment.

The acetic acid extract, which contains substantially all of the known hormone content of the intestinal material, is then cooled to a temperature substantially below room temperature, i.e. of the order of 0° C., a filter aid such as diatomaceous earth added thereto and filtered. The filtrates are then treated as by stirring for a substantial period of time, i.e. of the order of 12 to 24 hours at a temperature below room temperature with a cation exchanger of high molecular weight containing carboxylic groups. An especially desirable cationic exchanger is alginic acid. Still another is oxycellulose. Synthetic resin cation exchangers such as for example Amberlite IRC 50 (H), of a weakly acid carboxylic type are less suitable. It is characteristic of all of these carboxylic ion exchangers that they are capable of adsorbing a weakly basic protein or polypeptide material.

The hormones thus adsorbed by the cation exchanger may be removed therefrom by treatment with dilute mineral acid. A preferable acid for this purpose is hydrochloric acid of 0.2 N. Thereafter, the solution of hormones in the eluate derived from acid treatment are precipitated by treatment with an inorganic salt such as sodium chloride, the eluate being saturated with the salt for the complete removal of the hormone content. The resultant precipitate may be then purified by washing with a saturated aqueous solution of salt, dissolving the washed precipitate in water and again precipitated from the water with salt. The resultant concentrate contains in a relatively small mass substantially the entire amount of secretin, pancreozymin and cholecystokinin originally present in the intestinal mucosa and is free from enzymes and bulky protein precipitates, its weight being only 3% of that of the crude product obtained with sodium chloride from the extract made with dilute mineral acids on native intestinal mucosa.

The secretin may be separated from the concentrate thus produced by extraction with a lower aliphatic alcohol such as methyl alcohol since it is more soluble in such alcohol than the cholecystokinin or pancreozymin.

Thus to prepare the cholecystokinin-pancreozymin concentrate previously referred to, the product containing in addition to these hormones, the secretin, is dissolved in water, alcohol added and then the pH is adjusted to 7.2 with alcoholic alkali. The precipitate formed is then removed by filtration. The filtrate is diluted with acetic acid and again treated with alginic acid. The hormones adsorbed by the alginic acid are removed therefrom with dilute mineral acid and precipitated from the eluate with an inorganic salt. The second concentrate thus prepared is again dissolved in water and treated with alkali to pH 7.2 and filtered. The filtrate was then acidified and saturated with an inorganic salt to precipitate the hormones. The precipitate was then treated with methanol to remove the secretin. After removal of the secretin the residue was further purified by solution in sodium chloride solution, precipitation with sodium chloride and by further solution and the treatment with solvents to be hereinafter described in detail. The final solution in butanol was lyophlized to give the potent dry concentrate.

The following specific examples serve to illustrate but are not intended to limit the present invention.

*Example I*

The first meter of duodenum of hog is taken out immediately after the slaughter and is put into ice water. The duodenum is everted and carefully washed with ice water and then immersed for five minutes in boiling water for destroying enzymes and coagulating inert proteins. 500 m. of duodenum treated in this way which have been kept in a frozen condition in the meantime are extracted for 20 hours at room temperature with 100 liters of 0.5 N acetic acid. The extract is cooled to a temperature of 0° C., about 0.5 kg. of diatomaceous earth (Hyflo-supercel) is added and filtered through a fabric. The filtrates are stirred for 12 to 24 hours at a temperature of +5° C. with 1 kg. of alginic acid which has been washed first with 0.2 N hydrochloric acid and then with water until the washing water does not react acid to Congo red. The alginic acid and the adsorbed substances are collected upon a suction filter, are washed upon the filter and then suspended for 15 minutes in 5 liters of 0.2 N hydrochloric acid. The eluate is filtered off and the alginic acid is washed with further 5 liters of 0.2 N hydrochloric acid. The eluate and the washing water are united and are precipitated with sodium chloride at full saturation. The precipitate is collected upon a suction filter and washed with a saturated aqueous solution of sodium chloride. It is then dissolved in 1000 ml. of water and is again precipitated with sodium chloride at full saturation.

The precipitate contains practically the whole amount of secretin, cholecystokinin and pancreozymin present in the intestinal mucosa.

The secretin can be separated from the other two hormones, cholecystokinin and pancreozymin, by its greater solubility in low molecular alcohols, such as propyl alcohol.

*Example II*

105 g. of the material of Example I was dissolved in water to a concentration of 5 g. per 100 ml. solution. 2 volumes of 95% ethanol were added and the pH of the solution determined electrometrically brought to 7.2 with a mixture of one part of 1 N NaOH and two parts of 95% ethanol. The precipitate formed was filtered off on fluted paper (Whatman 3 MM) and discarded. The clear filtrate was diluted with an equal volume of 0.15% acetic acid. 100 g. of alginic acid which had been prewashed with 0.2 N HCl and then water was suspended in the diluted filtrate. After stirring for one hour at room temperature the alginic acid containing the adsorbed hormones was collected on a suction filter and washed on the filter with 0.005 N HCl. The filtrate and washings were discarded. Elution of the hormones from the alginic acid was carried out under stirring for ten minutes with 1.5 liters of 0.2 N HCl. The alginic acid was filtered off and washed with water. It was ready for the next adsorption. When not in use it was stored moist and frozen. The eluate was saturated with sodium chloride. The precipitate that formed was collected on a suction filter. It weighed 20.5 g.

This precipitate was dissolved in water to a concentration of 5 g. per 100 ml. and the pH of the solution brought to 7.2 with 0.1 N NaOH. A precipitate was formed. 2 g. of Hyflo Super Cel prewashed with 2 N HCl and water and dried at 150° C. were added to every 100 ml. of the solution and the mixture filtered with suction. The residue was discarded and the clear filtrate brought to pH 4.5 with N HCl, and saturated with sodium chloride. The precipitate that formed was collected on a suction filter. It was covered on the filter with a layer of soft plastic and sucked as dry as possible. It weighed 14 g. This precipitate was triturated at room temperature with 50 ml. methanol (analytical reagent grade) per g. precipitate. The suspension was filtered on a suction filter. The filtrate contained the main part of the secretin and could be processed with respect to this. The undissolved material which contained cholecystokinin and pancreozymin was washed on the filter with methanol, n-butanol (analytical reagent grade) and ether. The air dried material weighed 5 g. It was dissolved in 100 ml. of a 1.5% aqueous sodium chloride solution. The pH was adjusted to 6.5 with 0.1 N NaOH and the solution saturated with sodium chloride. The precipitate that formed was collected on a suction filter, covered with plastic and sucked as dry as possible. The moist material which weighed 9 g. was dissolved in 90 ml. of distilled water. Three volumes of absolute ethanol were added to the solution at room temperature. The precipitate that formed was filtered off on soft fluted paper (Whatman 3 MM) and discarded. To the clear filtrate three volumes of n-butanol (analytical reagent grade) were added. The butanol had been precooled to −15° C. After a few hours at this temperature the precipitate that formed was collected on a suction filter and washed on the filter with butanol and ether. After the ether had evaporated the precipitate was dissolved in water, the pH adjusted to 5.5 with 0.1 N HCl and the solution lyophilized. The resulting dry powder was a potent concentrate of cholecystokinin and pancreozymin. It also had a weak secretin effect. Preparations of this kind may be used clinically. Three mg. injected intravenously being the dose necessary for maximal contraction of the healthy gall bladder in the adult.

The material may be further purified by chromatography on carboxymethyl cellulose or by electrophoresis. In this way preparations may be obtained of which less than 1 mg. is sufficient for maximal contraction of the gall bladder.

This application is a continuation-in-part of application Serial No. 539,696, filed October 10, 1955, now abandoned.

We claim:

1. A process for the production of a concentrate containing in a relatively small mass the secretin, cholecystokinin and pancreozymin hormone content of the intestinal mucosae of animals, which consists essentially in treating an animal intestine material with hot water at a temperature of approximately 100° C. for a period of time sufficient to inactivate the enzymes and coagulate the inert protein content thereof, and extracting the treated intestinal material with a dilute solution of acetic acid.

2. The process of claim 1 wherein the period of treatment is from approximately 5 to 10 minutes.

3. A process for the production of a concentrate containing in a relatively small mass the secretin, cholecystokinin and pancreozymin hormone content of intestinal mucosae of animals which consists essentially in treating an animal intestinal material with hot water at a temperature of approximately 100° C. for a period of time sufficient to inactivate the enzymes and coagulate the inert protein content thereof, extracting the treated intenstinal material with dilute solution of acetic acid, treating the extract to adsorb the hormone content so obtained with a cation exchanger of high molecular weight containing carboxylic groups and capable of removing the hormone content from the extract, and thereafter eluting the adsorbed hormones from the cation exchanger.

4. The process of claim 3 wherein the cation exchanger is alginic acid.

5. A process for the production of a concentrate containing in a relatively small mass the secretin, cholecystokinin and pancreozymin hormones content of the intestinal mucosae of animals, which consists essentially in treating an animal intestine material with hot water at a temperature of approximately 100° C. for a period of time sufficient to inactivate the enzymes and coagulate the inert protein content thereof, and extracting the treated intestinal material with 0.5 N acetic acid.

6. A process for the production of a concentrate containing in a relatively small mass the secretin, cholecystokinin and pancreozymin hormone content of intestinal mucosae of animals which consists essentially in treating an animal intestinal material with hot water at a temperature of approximately 100° C. for a period of time sufficient to inactivate the enzymes and coagulate the inert protein content thereof, extracting the treated intestinal material with 0.5 N acetic acid, treating the extract so obtained with a cation exchanger of high molecular weight containing carboxylic groups and capable of removing the hormone content from the extract to absorb said hormone content, and thereafter eluting the adsorbed hormones from the cation exchanger with a dilute solution of mineral acid.

7. An active hormone composition in concentrated form substantially identical in hormonal activity to an extract prepared by treating animal intestinal mucosae with hot water at about 100° C. for a time to inactivate the enzymes, coagulate inert protein and extracting with dilute solution of acetic acid, said composition consisting essentially of cholecystokinin and pancreozymin having a concentration of cholecystokinin sufficient so that a dose of up to 3 mg. will cause contraction of the gall bladder.

References Cited in the file of this patent

UNITED STATES PATENTS 1,181,424    Beveridge _____ May 2, 1916

OTHER REFERENCES

U.S. Dispensatory, 24th Ed., 1947, pp. 1441–1442.
Jorpes, Biochemical Jour., 52:2 (1952) p. 327.
Weaver, J.A.M.A. 87:9 (Aug. 28, 1956) pp. 640–643.
Friedman, Procs. of the Soc. for Exptl. Biol. &. Med. 73:1 (Mar. 1950), pp. 345–348.
Chemical Abstracts, vol. 48 (1954) pp. 3438i–3439a.
Jorpes, Arkiv. Kemi, vol. 16 (1953) pp. 273–276.